United States Patent Office 2,857,243
Patented Oct. 21, 1958

2,857,243

DRY ALKALI CHLOROTITANATES AND METHOD OF MAKING THE SAME

Fredric V. Schossberger, Hinsdale, Ill., assignor to Armour Research Foundation of Illinois Institute of Technology, Chicago, Ill., a corporation of Illinois No Drawing. Application February 8, 1957
Serial No. 638,933

4 Claims. (Cl. 23—87)

This invention relates to a method of making dry alkali chlorotitanates and to the novel dried products so produced. More particularly my invention encompasses the procedure whereby titanium solutions are converted to useful, dry chlorotitanate crystals. The titanium solutions are made from titanium ores or other titanium bearing materials in accordance with methods well known by those skilled in the processing of these materials.

The alkali chlorotitanates find use as the starting, or raw, material in the production of titanium metal, titanium tetrachloride, titanium pigments, and other members of the industrial titanium family. For various reasons discussed below, in the manufacture of titanium and its tetrachloride it is quite imperative that substantially, if not completely, dry chlorotitanate be used. The presence of water, or other oxygen yielding materials either physically or chemically bound to the crystal, is extremely detrimental to its usefulness in making the other aforementioned materials. In view of this dryness requirement, the instant invention is directed to a rather simple, convenient process whereby such requirement may be met, and to the novel products so produced.

At the onset it should be understood that by the term "alkali chlorotitanate" not only do I define the potassium, sodium, rubidium and cesium salts, but that ammonium chlorotitanate is also included within such class. I feel certain that such inclusion is in accordance with good chemical practice.

To best understand the novel concepts of the instant invention brief reference must be had to that art which concerns the treatment of titaniferous materials. It has been known for many years that, for example, the titanium ore, ilmenite, may be partially dissolved in strong acid solutions and that by known procedures of removing insoluble materials and impurities an acid titanium solution may be produced. The prior art also shows that such acid titanium solutions may be treated with hydrogen chloride and potassium chloride to yield thereby potassium chlorotitanate precipitate. As this precipitation occurs a portion of the mother liquor is picked up by such particles, apparently through both a physical and chemical bonding mechanism. It is to this point that the prior art has gone. When the particles are separated from this supernatant mother liquor they are found to contain more than ten percent moisture, and even after rigorous centrifuge treatment such moisture content remain in the order of three percent or more.

In the past alkali chlorotitanates have been used to make titanium oxide pigments. For this particular usage the water bound in the precipitated product is not detrimental since the pigments are precipitated from solutions of such alkali chlorotitanates. As described in my copending patent application, Serial No. 552,227, alkali chlorotitanates may be decomposed by heat to titanium tetrachloride, or reduced with metals such as magnesium to ductile titanium metal, the latter usage being disclosed in my copending applications filed on even day herewith, which applications will be further identified by subsequent amendment hereto. For purposes of producing the tetrachloride or the metal the precipitated alkali chlorotitanate must be dried to such an extent that no hydrolysis of the titanium be possible during the decomposition or reduction of the salt. If, for example, moist potassium chlorotitanate is subjected to a thermal or vacuum drying process it is partially or completely converted to titanium dioxide, alkali chloride and hydrogen chloride, such conversion being dependent to a great extent upon the amount of available oxidizing substances. Once titanium dioxide has been formed no decomposition into titanium tetrachloride or reduction to ductile titanium is possible.

My original attempts to remove the physically and chemically bound mother liquor from the moist chlorotitanate by usual chemical means failed. The usual procedure for removing water, that is, by heating the material or by a vacuum treatment only hydrolyzes the product.

In view of the problems encountered in the prior art the object of the instant invention is to produce substantially dry alkali chlorotitanates; that is to remove the bound water from such crystals to a point where less than 0.03% moisture remains. As a maximum, the moisture content must be set at that value which, while permitting a small degree of oxide formation, does not render the alkali chlorotitanate economically useless for subsequent reduction.

The crux of my invention lies in my discovery that the aforementioned moist chlorotitanates may be dried by subjecting them to dry hydrogen chloride gas while applying moderate heat thereto. The result of such procedure is that instead of hydrolyzing the moist particles to titanium oxide, the water is removed by the gas and dry alkali chlorotitanate results.

In order that my invention may be fully understood an example of how such dry alkali chlorotitanates may be produced is presented below. For purposes of illustrating how my process extends beyond the prior art, a complete process commencing with ilmenite ore and ending with dried potassium chlorotitanate is shown, it being understood that my invention is directed to the drying process within such overall procedure.

The ilmenite ore is first ground to approximately 250 mesh and the powdery particles mixed with sulfuric acid (66 Baumé) or a mixture of sulfuric and hydrochloric acids. The acid or acids used may be recycled from other steps of the instant process. Next, the ilmenite-acid mixture is rapidly heated to from approximately 80° to 120° C. Such heating causes the solidification of the reaction product mixture. The solidified mass is next leached with either dilute sulfuric acid or again a mixture of recycled sulfuric and hydrochloric acids to yield an acid solution of titanium and iron. Not only is the titanium and iron solution obtained but additional insoluble material is precipitated. Such insoluble precipitate is readily separated from the titanium-iron solution by filtration. It is now necessary to remove the iron sulfate (and iron chlorides if present) from the solution. Approximately 70% of the iron present may be crystallized out in the form of iron sulfate (and again, iron chloride) merely by cooling the solution to between 5° and 15° C. The material is then separated from the solution.

The next step is to saturate the now partially iron-free solution with hydrogen chloride gas. Such saturation is accomplished at low temperature, preferably at −10° to −20° C. At this low temperature most of the remainder of the iron originally present precipitates in the form of iron chloride which is then separated from the titanium solution.

Solid potassium chloride is now added to the cooled acid titanium solution at about 0° C. This precipitates potassium chlorotitanate. About 95% of the titanium solution has now been converted into solid potassium chlorotitanate. Such chlorotitanate is filtered and the precipitate dissolved in hydrochloric acid. Subsequent cooling of the solution and the addition of gaseous hydrogen chloride thereto results in the reprecipitation of such potassium chlorotitanate. Although not absolutely essential to the instant process, it is this last step of reprecipitating the alkali chlorotitanate which makes the material especially well suited for subsequent treatment. Not only has it been thus purified but additionally larger crystals which provide greater ease of filtration and subsequent drying result. It is of course understood that other means of purifying the precipitate, such as an acid wash, may be used.

The precipitate is now centrifuged to separate it from the supernatant liquor. At this point the solid residue contains about 2 to 3% moisture in the form of a concentrated hydrochloric acid solution.

The next step of my process is directed to the removal of this moisture and represents the important step in my invention. I have found that the rather tenaciously bound water may be efficiently and readily removed without hydrolysis of the product by passing a stream of dry hydrogen chloride gas through the partially dried alkali chlorotitanate, such procedure being carried out at a temperature of from 20° to 300° C. By this treatment a solid product with a water content of 0.01 to 0.03% may be obtained.

Quantitative production of dry potassium chlorotitanate may be seen from the following example: 362 parts of ilmenite containing 50.0% $TiO_2$ were mixed with 724 parts of (66 Baumé) sulfuric acid and the mixture rapidly heated to a temperature of 95° C. until the mass solidified. Such mass product was leached with sulfuric acid to obtain a titanium solution containing 133 grams of iron per liter. Upon cooling of this solution to 5° C., 80% of the dissolved iron was precipitated in the form of iron sulfate. Subsequent to filtration the solution analyzed as follows:

| | Grams per liter |
|---|---|
| Titanium | 100 |
| $H_2SO_4$ | 440 |
| Fe | 28 |

Further cooling of the solution to −17° C. accompanied by saturation with hydrochloric acid gas precipitated the remainder of the iron as iron chloride. After removal of the iron, 290.4 parts of solid potassium chloride were added to the solution to form small particles of solid potassium chlorotitanate. The latter particles were separated from the supernatant solution by centrifuging. Following this the wet solid was redissolved in concentrated hydrochloride acid. Large crystals of $K_2TiCl_6$ were crystallized and reprecipitated by saturating the hydrochloric acid solution with hydrogen chloride gas at 0°–15° C. The recrystallized material was centrifuged, then dried in a rotary kiln at temperatures between 20° and 220° C. for 3 hours under an atmosphere of hydrogen chloride gas. At the end of this time 660 parts of dry potassium chlorotitanate were obtained.

It should be understood that all alkali chlorotitanates may be dried by the use of my process.

I claim as my invention:

1. The method of making a material selected from the group comprising dry alkali metal chlorotitanates and ammonium chlorotitanate from titanium-bearing materials comprising the steps of: mixing said material with an acid selected from the group consisting of sulfuric and a mixture of hydrochloric and sulfuric to form a titanium solution; separating said titanium solution from the undissolved materials therein; treating said titanium solution with hydrogen chloride gas; adding a material selected from the group consisting of alkali metal chlorides and ammonium chloride whereby a material selected from the class consisting of alkali metal chlorotitanate and ammonium chlorotitanate is precipitated; separating said precipitated chlorotitanate from the supernatant solution and drying said chlorotitanate to less than 0.03% moisture retention by passing hydrogen chloride gas therethrough while maintaining said chlorotitanate at a temperature of 20° to 300° centigrade.

2. The method of making dry alkali metal chlorotitanate from crystals thereof having physically and chemically bound water therein comprising the step of: subjecting said crystals to dry hydrogen chloride gas while maintaining said crystals at a temperature of from 20° to 300° C. whereby less than 0.03% moisture is retained in said crystals.

3. The method of making dry potassium chlorotitanate from crystals thereof having physically and chemically bound water therein comprising the step of: subjecting said crystals to dry hydrogen chloride gas while maintaining said crystals at a temperature of from 20° to 300° C. whereby less than 0.03% moisture is retained in said crystals.

4. The method of making dry ammonium chlorotitanate from crystals thereof having physically and chemically bound water therein comprising the step of: subjecting said crystals to dry hydrogen chloride gas while maintaining said crystals at a temperature of from 20° to 300° C. whereby less than 0.03% moisture is retained in said crystals.

References Cited in the file of this patent

UNITED STATES PATENTS

| 1,085,098 | Arsem | Jan. 27, 1914 |
| 1,354,279 | Browne | Sept. 28, 1920 |
| 1,880,505 | Smith | Oct. 4, 1932 |
| 2,765,270 | Brenner et al. | Oct. 2, 1956 |

OTHER REFERENCES

Mellor: "Comprehensive Treatise on Inorganic and Theoretical Chemistry," vol. 7, 1927, pages 78, 85.